Feb. 17, 1970   H. WIDMER ET AL   3,495,398
WATERTIGHT WATCH-CASE WITH LAMINATED CRYSTAL
Filed July 10, 1968
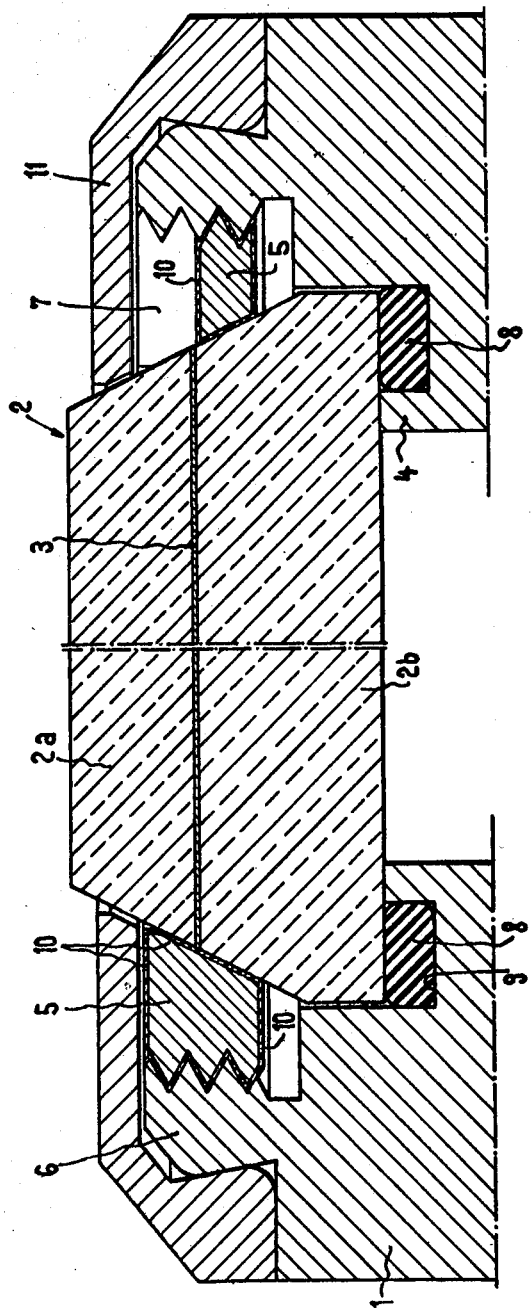
INVENTORS
HANS WIDMER
EDUARD SCHNYDER
PAUL WESSEL
BY *Imirie & Smiley*
ATTYS.

United States Patent Office 3,495,398
Patented Feb. 17, 1970

3,495,398
WATERTIGHT WATCH-CASE WITH LAMINATED CRYSTAL
Hans Widmer and Eduard Schnyder, Biel, and Paul Wessel, Nidau, Switzerland, assignors to Omega Louis Brandt & Frere SA, Bienne Berne, Switzerland
Filed July 10, 1968, Ser. No. 743,815
Claims priority, application Switzerland, July 10, 1967, 9,814/67
Int. Cl. G04b 39/00
U.S. Cl. 58—91                                5 Claims

ABSTRACT OF THE DISCLOSURE

A watertight watch-case, comprising a caseband and a crystal, wherein the crystal, consisting of toughened mineral glass, is made of two portions stuck together by means of a transparent adhesive having the same index of refraction as the said glass, and is secured on the caseband by means of a ring screwed into the caseband and bearing against the lower portion or against both portions of the crystal, the said ring being coated, at least on its surface in contact with the crystal, with a thin film of a plastic material.

---

The watertight watches, more particularly the diver's watches, are very easily "hurt" when they are used without care.

The organic glasses which are mounted in these watches are particularly damaged when the conditions of use are severe; after a short time, they are scratched very strongly and often to such an extent that reading of the dial is difficult. On the other hand, the organic glasses are permeable to water.

The mineral glass physically or chemically hardened (in the latter case for instance the glass "Chemcor," trademark of the Corning Company) is practically impermeable to water. On the other hand, it offers a resistance to scratch and shock which is very remarkable and greater than that of the organic glasses. However, the resistance to shocks being limited to a superficial layer, is maintained only when the said layer is intact. In the case where this superficial layer is destroyed, even at a single place, the mineral glass loses its resistance to shocks and becomes more brittle than the organic glass. The danger of break and its consequences (loss of the water-tightness) are very important in such a case.

The present invention aims at overcoming this drawback and the danger of losing the water-tightness. It relates to a watertight watch-case, comprising a caseband and a crystal, which is characterized in that the crystal, consisting of toughened mineral glass, is made of two portions stuck together by means of a transparent adhesive having the same index of refraction as the said glass, and is secured on the caseband by means of a ring screwed into the caseband and bearing against the lower portion or against both portions of the crystal, the said ring being coated, at least on its surface in contact with the crystal, with a thin film of a plastic material.

The accompanying drawing illustrates, by way of example, an embodiment of the invention.

The single figure is an axial cross-sectional view of this embodiment.

The watch-case shown in the drawing includes a caseband 1 and a crystal 2, made of two portions 2a and 2b. The caseband 1 is made integral with the back (not illustrated) or supports a separate back. The crystal 2 consists of mineral glass, physically or chemically toughened. One says that glass is physically toughened when it has been subjected to a hardening operation which provokes the formation of very high constraints or tensions in the outer layers. The existence of these constraints completely modifies the conditions in which fissures begin to appear in glass; and this just improves the resistance to shocks. The layer under tension may also be obtained by a chemical method instead of being obtained by hardening. These chemically toughened glasses are for instance made of alkaline aluminosilicates and the treatment consists in placing the machined objects in a bath of potassium nitrate containing sometimes silver nitrate. An exchange takes place by diffusion between the ions of the glass and those of the bath and high constraints appear after cooling.

Both portions 2a and 2b of the crystal 2 are stuck together by means of a transparent adhesive 3 having the same index of refraction as the glass of the crystal 2.

The crystal 2 has as a whole the general shape of a truncated cone and its base lies on a collar 4 of the caseband 1. A ring 5 is screwed in a flange 6 of the caseband 1 and bears against both portions 2a and 2b of the crystal 2, i.e. against the outer surface of the above-mentioned truncated cone. In a modified embodiment, not shown, the ring 5 might bear only against the lower portion 2b of the crystal 2. The ring 5 presents notches such as 7, the number of which is for example three, allowing to engage a suitable tool for screwing and unscrewing the ring 5. When the ring 5 is screwed, the crystal 2 is pressed against the collar 4 of the caseband 1, thereby compressing in a limited manner a packing ring 8 arranged in a groove 9 of the caseband 1. The packing ring 8 is an O-ring or a hollow ring of stainless steel, coated with a film of Teflon; such a ring ensures a very good tightness also at the moment when the watch-case is subjected to strong variations of pressure.

The ring 5 is coated over its whole surface with a thin film 10 of a plastic material, for instance of Teflon. In a modified embodiment, the ring 5 might present the film 10 only on its portion in contact with the crystal 2.

A false bezel 11 is snap-fitted on the flange 6 of the caseband 1 and serves for concealing the ring 5.

The watch-case described presents among others the following advantages:

(a) The crystal of mineral glass is practically impermeable to water, contrary to the organic glasses;

(b) The crystal is very hard and scratch-proof;

(c) In the case of a break of the outer portion of the crystal, the lower portion thereof always ensures a tight closure of the case;

(d) The film of plastic material coating the fixing ring guarantees an excellent tightness, gives a certain elasticity to the attachment of the crystal, and, in addition, ensures a good protection against corrosion.

What is claimed is:

1. A watertight watch-case, comprising a caseband and a crystal, characterized in that the crystal, consisting of toughened mineral glass, is made of two portions stuck together by means of a transparent adhesive having the same index of refraction as the said glass, and is secured on the caseband by means of a ring screwed into the caseband and bearing against the lower portion or against both portions of the crystal, the said ring being coated, at least on its surface in contact with the crystal, with a thin film of a plastic material.

2. A watch-case according to claim 1, characterized in that the crystal presents as a whole the shape of a truncated cone, the fixing ring bearing against the outer surface of the said truncated cone.

3. A watch-case according to claim 1, characterized in that its comprises a packing ring arranged in a groove of the caseband, the said packing ring being compressed in a limited manner when the fixing ring is screwed into the caseband.

4. A watch-case according to claim 3, characterized in that the said packing ring is an O-ring.

5. A watch-case according to claim 3, characterized in that the said packing ring is a hollow ring of stainless steel, coated with a lubricating anticorrosive layer of Teflon.

References Cited

UNITED STATES PATENTS 3,030,763   4/1962   Klingenberg _____ 58—91 X

FOREIGN PATENTS 299,425     Switzerland.
343,324     Switzerland.

STEPHEN J. TOMSKY, Primary Examiner

G. H. MILLER, Jr., Assistant Examiner